P. BALLARD.
Ditching Plow.
No. 80,113.
Patented July 21, 1868.
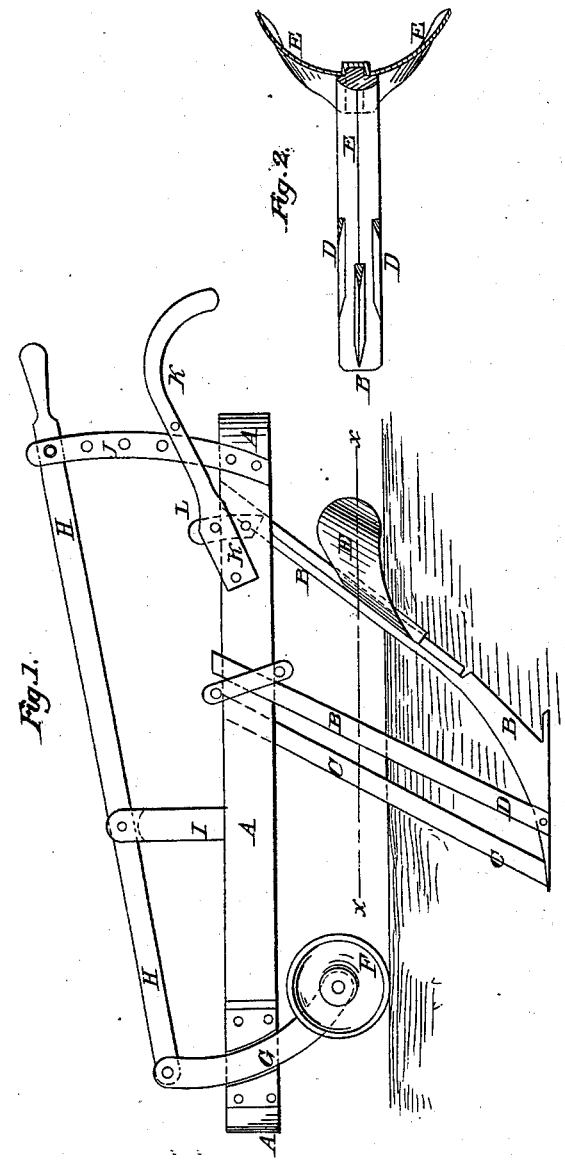

United States Patent Office.

PHILIP BALLARD, OF TEXAS, OHIO.

Letters Patent No. 80,113, dated July 21, 1868.

---

IMPROVEMENT IN DRAIN-PLOWS.

---

*The Schedule referred to in these Letters Patent and making part of the same.*

---

TO ALL WHOM IT MAY CONCERN:

Be it known that I, PHILIP BALLARD, of Texas, in the county of Henry, and State of Ohio, have invented a new and useful Improvement in Drain-Plows; and I do hereby declare that the following is a full, clear, and exact description thereof, which will enable others skilled in the art to make and use the same, reference being had to the accompanying drawings, forming part of this specification, in which—

Figure 1 is a side view of my improved plow.

Figure 2 is a detail sectional view of the same, taken through the line $x\,x$, fig. 1.

Similar letters of reference indicate like parts.

My invention has for its object to furnish an improved plow for opening tile-drains, which shall be simple in construction, and effective in operation. It consists in the construction and combination of the various parts, as hereinafter more fully described.

A is the plow-beam, to the forward end of which the draught is applied, in the ordinary manner.

B is the share, which is made of such a length as will open a drain to the required depth. The forward side of the share is made convex, or is rounded off, as shown in fig. 2, and is made to equal in breadth the desired width of the drain.

The upper end of the share B is attached to the rear part of the beam A, at such an inclination that as the plow advances, the soil or clay may pass up the said share to the surface of the ground. The lower end or point of the share is so formed as to slice the ground to the desired depth, leaving the bottom of the drain level and smooth.

C is a cutter, the lower end of which is attached to the centre of the point or forward edge of the share B, and its upper end to the middle of the beam A.

D are two cutters, the lower ends of which are attached to the side of the lower end of the share B, and their upper ends are secured to the sides of the beam A, so as to cut or separate the ground to be raised from the sides of the drain, leaving said sides smooth and true.

The cutters C and D should be set inclined, but need not be so much inclined as the share B.

E are two wings, adjustably attached to the rear side of the share B, so that they may be moved up after each cut, and so adjusted as to be put above the surface of the ground, so as to push the ground raised by the plow back from the edge of the drain.

The wings E may be secured to the rear side of the share B, by having a dove-tailed groove formed in the middle part of said wings, fitting upon a dove-tailed rib, formed upon the rear side of the share B, as shown in fig. 2.

F are the gauge-wheels, two of which are used, one running upon each side of the drain. The gauge-wheels F are pivoted to the lower ends of two curved arms G, one upon each side of the forward end of the beam A, said arms working in notches formed in or upon the said sides of the said beam A.

The upper ends of the arms G are pivoted to the forward end of the lever H, which is pivoted to a support, I, attached to the upper side of the beam A, and its rear end extends back into such a position that it may be conveniently reached and operated by the driver.

To the rear part of the lever H is attached a pin, which enters one or the other of the holes in the upwardly-projecting curved bar J, attached to the rear end of the beam A, as shown in fig. 1. This enables the gauge-wheels F to be conveniently adjusted, so that the plow may be run at any desired depth.

K are the handles, which may be rigidly attached to the rear part of the beam A, or they may be adjustably attached to said beam by pivoting their forward ends to said beam, by a pin or bolt, and adjustably attaching the middle part of the handles to the curved supports L.

Having thus described my invention, I claim as new, and desire to secure by Letters Patent—

1. The cutters C and D, share B, and adjustable wings E, constructed and arranged substantially as herein shown and described, in combination with the beam A, as and for the purpose set forth.

2. The combination of the gauge-wheels F, curved arms G, lever H, support I, and curved adjusting-arm or bar J, with each other, and with the beam A, substantially as herein shown and described, and for the purpose set forth.

PHILIP BALLARD.

Witnesses:
E. M. HALLOPETER,
PETER N. LANTZ.